June 22, 1937.  D. E. DOBYNS  2,084,631
BEVERAGE DISPENSING MECHANISM
Filed Jan. 17, 1935   2 Sheets-Sheet 2
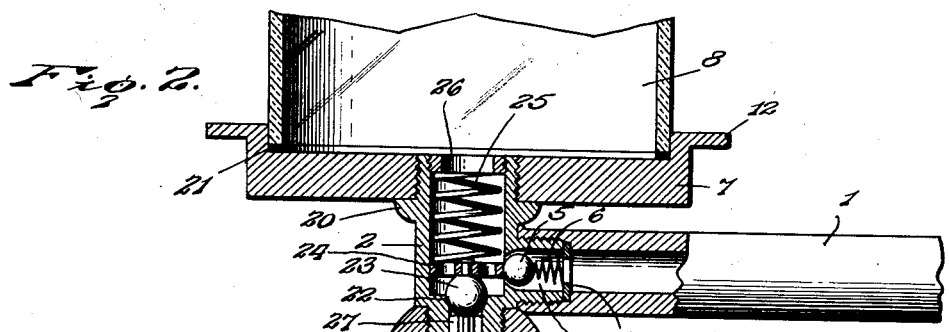
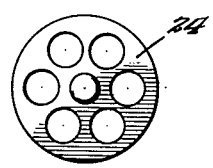
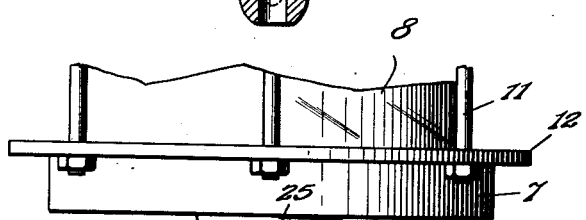
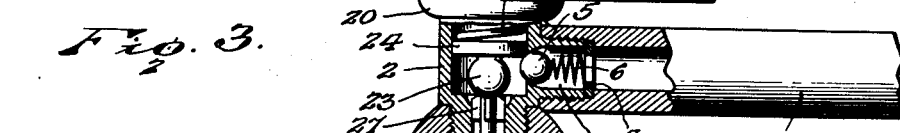
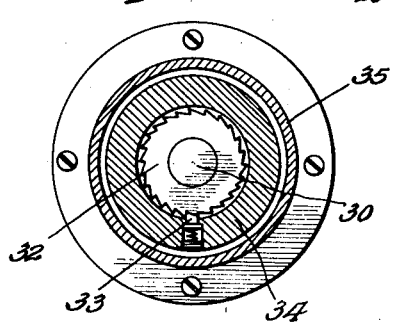
Inventor
D. E. Dobyns.
By Lacey & Lacey,
Attorneys Patented June 22, 1937

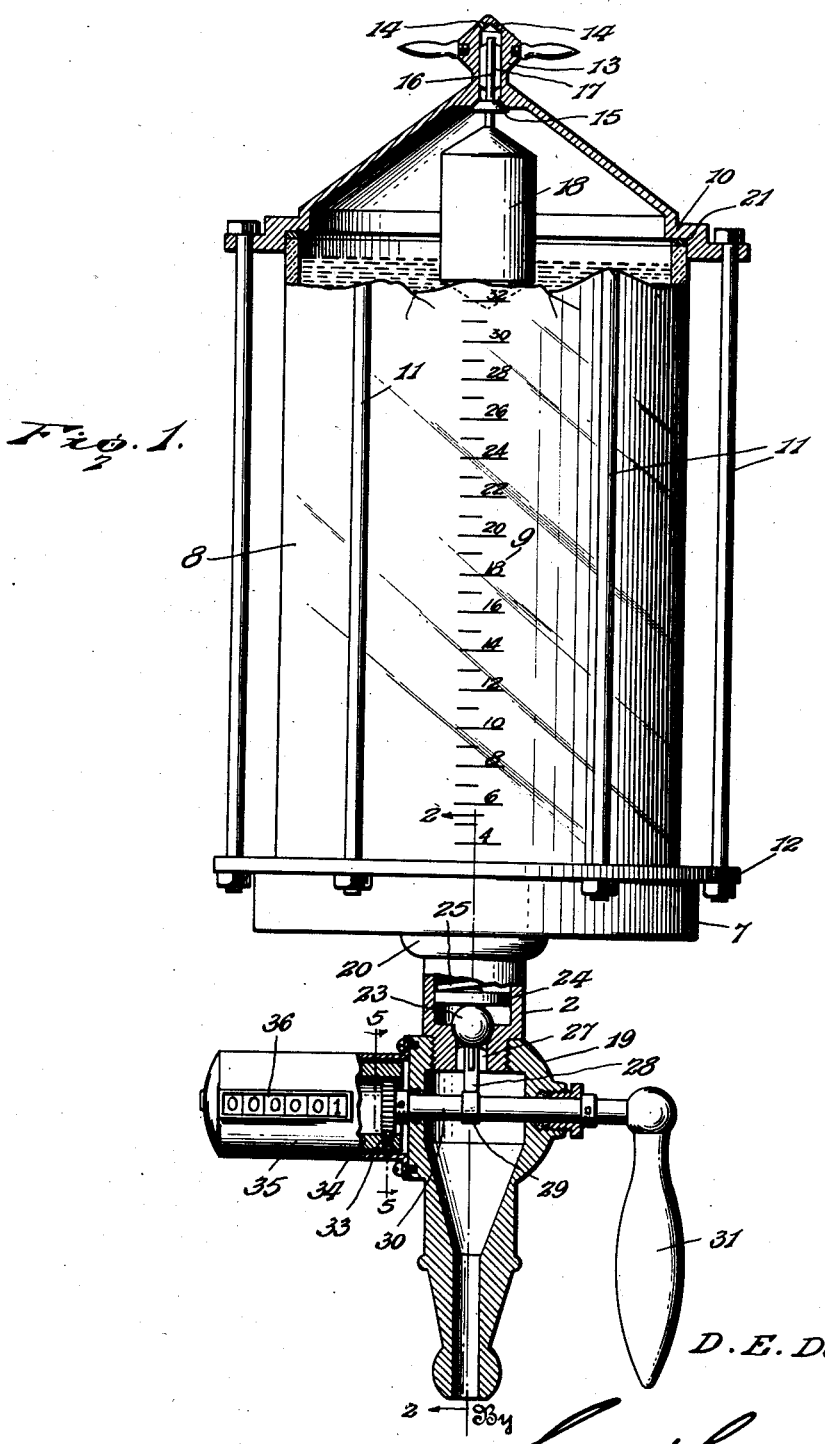

2,084,631

UNITED STATES PATENT OFFICE 2,084,631

BEVERAGE DISPENSING MECHANISM

David E. Dobyns, Oklahoma City, Okla.

Application January 17, 1935, Serial No. 2,273

5 Claims. (Cl. 221—112)

This invention relates to liquid-dispensing apparatus and has for its object the provision of a simple mechanism which may be mounted upon a dispensing faucet and measure the quantity of liquid drawn from a supply vessel and record the number of operations of the dispensing faucet. It is an object of the invention to provide a measuring vessel provided with means for cutting off the flow of liquid thereinto when the liquid has reached the capacity of the vessel, and it is also an object of the invention to provide means whereby when liquid is being drawn from the vessel, the further inflow of liquid from the source of supply will be prevented, and when the outflow from the measuring vessel has been cut off, the supply in the vessel may be automatically replenished. These several objects, and other objects which will appear as the description proceeds, are attained in such a mechanism as is illustrated in the accompanying drawings, and the invention resides in certain novel features which will be particularly defined in the claims following the description.

In the drawings:

Figure 1 is a front elevation, with parts broken away and in section, of an apparatus embodying the invention.

Figure 2 is a section on the line 2—2 of Figure 1.

Figure 3 is a view similar to Figure 2 but showing the parts in a different position.

Figure 4 is an enlarged detail plan view of the spider or member for controlling the flow from the source of supply.

Figure 5 is an enlarged detail section on the line 5—5 of Figure 1.

The apparatus is designed primarily for use in dispensing beer from kegs, although, of course, it is adapted for use in dispensing other beverages or liquids. In the drawings, the reference numeral 1 designates a pipe or faucet leading from a keg or other reservoir. A coupling 2 has a lateral branch or nipple 3 which is threaded into the outer end of the supply pipe 1, a washer 4 being interposed between the end of the nipple and a shoulder formed in the pipe, as shown in Figures 2 and 3. The bore of the nipple 3 is tapered at its junction with the main body of the coupling 2 to form a seat for a ball valve 5 which is held normally to the seat by an expansion spring 6 disposed within the nipple between the valve and the washer 4, as shown in Figures 2 and 3 and as will be understood. This ball valve serves as a check valve to permit flow from the keg or other reservoir when the valve is unseated but prevent flow into the reservoir when the valve is seated. The coupling 2 is threaded at its upper end into a plate 7 which constitutes the base of a measuring vessel, the body of which consists of a transparent cylinder 8 seated in the base, as clearly shown in Figure 2 and having a scale, indicated at 9, marked upon its outer surface and extending from its lower to its upper end. A head cap 10 is fitted over the upper end of the cylindrical body 8 and is held to the body by long bolts 11 fitted through the margin of the cap and through a flange 12 on the base 7, as clearly shown. The head cap 10 is of conical formation and has a tubular knob 13 rising from its apex, said knob having vent openings 14 therein and imparting to the device a somewhat ornamental appearance. A valve 15 is provided within the head cap and is adapted to seat in the lower end of the bore of the hollow knob 13, as clearly shown in Figure 1. A stem 16 extends from the valve and on its upper portion carries ribs or a spider 17 which fits closely but slidably within the knob and thereby holds the valve to a rectilinear path in its movements while permitting the egress or ingress of air. A float 18 of any approved form is carried by the lower end of the valve stem and serves to seat the valve as liquid rises in the measuring vessel, in an obvious manner.

The lower end of the coupling 2 is threaded into the dispensing faucet 19 and upon the exterior of the coupling is provided a collar or stop flange 20 which is adapted to bear against the base member 7, as clearly shown, and thereby limit the insertion of the coupling into the base and also provide means for resisting leakage from the measuring vessel, it being noted further that gaskets, indicated at 21, are provided between the ends of the vessel 8 and the base and the head cap, respectively, for the same purpose. The lower end portion of the coupling is provided internally with an annular arcuate shoulder 22 which forms a seal for a cut-off ball valve 23, the seat 22 being below the opening and seat within which the check valve 5 operates, as clearly shown in Figs. 2 and 3. The ball valve 23 carries a spider 24 in spaced relation to said valve, the diameter of the spider being substantially equal to the diameter of the bore of the coupling so that, while the spider may move easily within the coupling when it is in the position shown in Figure 2, it will bear against the check valve 5 and unseat the same. It will be noticed that when the spider is in the lowered position shown in Figure 2, the valve 23 is seated and flow through the dispensing faucet is cut off but liquid may pass from the reservoir or supply vessel into the measuring vessel past the check valve. An expansion spring 25 is disposed within the coupling with its lower end bearing upon the spider 24 and its upper end bearing against a flange or ring 26 in the upper end of the coupling. This spring serves to yieldably hold the valve and spider in their lowered positions shown in Figure 2.

The stem of the valve 23 depends therefrom and is provided with guiding ribs 27 which slidably bear against the internal wall of the lower end portion of the coupling 2, as shown, so that the valve will be guided thereby. The extremity of the valve stem extends below the guiding ribs, as shown at 28, and bears upon a cam 29 which is formed on or rigidly secured to a rock shaft 30 extending through and journaled in the dispensing faucet 19 below the upper end thereof and equipped at one end with a handle 31. At the opposite end of the rock shaft 30 is secured a ratchet disc 32 which is engaged by a pawl 33 mounted in a counting cylinder 34. Said cylinder 34 is rotatably mounted in a casing 35 which is secured to the dispensing faucet 19, as shown in Figure 1, the cylinder constituting the unit element of a counter, indicated conventionally at 36. When the handle 31 is in the pendant position shown in Figure 1, the cam 29 will be in the position shown clearly in Figure 2 and the valve 23 will be seated. When the handle is rocked upwardly to the position shown by dotted lines in Figure 3, the cam 29 will be swung upwardly to the position shown in the same figure so that it will lift the valve 23 from its seat and carry the spider 24 to a position above the check valve 5 which will be thereupon seated by the spring 6. On this movement of the handle, the ratchet disc 32 will ride past the pawl 33, but upon the return movement of the handle to its normal or initial position, the ratchet will engage the pawl and will turn the counting cylinder 34 through a part of a revolution, and this action will occur every time the handle is manipulated so that the counter will be operated to register the number of times beverage is drawn from the measuring vessel.

From the foregoing description, taken in connection with the accompanying drawings, it will be understood that when the handle 31 is rocked upwardly to unseat the valve 23, and permit liquid to flow from the measuring vessel 8 through the faucet into a glass or other receptacle placed below the faucet, the inflow of liquid from the reservoir or source of supply to the measuring vessel will be cut off and when the handle is returned to its normal position, the valve 23 will automatically seat under the influence of the spring 25 so that further flow from the measuring vessel will be cut off and at this time the counter will register the sale. As the level of the liquid in the measuring vessel descends, the float 18 will drop and the valve 15 will be unseated so that air may enter through the venting knob 13 to aerate the liquid and prevent the formation of a vacuum which would retard or prevent its discharge. As the valve 23 is seated, the spider 24 will be lowered and the check valve 5 will be unseated so that liquid may again flow into the measuring vessel through the source of supply, and as the level of the liquid rises the float will, of course, rise with it and the valve 15 will be again seated, thereby cutting off the exit of air and arresting the further flow of the liquid when the capacity of the vessel has been reached.

The apparatus is very simple and automatic in its operation. The moving parts are all enclosed so as to be protected against tampering and not apt to get out of order. The measuring vessel is transparent so that the attendant may at any time notice the same and note the quantity of liquid therein. If, after liquid has been drawn from the vessel, at any time, the inflowing liquid does not replenish the supply to the full capacity of the vessel, the attendant will know that the main supply is exhausted and he will then have opportunity to requisition another keg or other quantity of the liquid to be connected to the dispensing apparatus.

Having thus described the invention, what is claimed as new is:

1. A liquid-dispensing apparatus comprising a measuring vessel, a coupling depending therefrom, a nipple on the coupling to be connected with a source of supply, a faucet depending from the coupling, a cam within the faucet, a valve in the coupling arranged to be unseated by the cam, a check valve in the nipple, and a member carried by the first-mentioned valve and acting on the check valve to unseat the same when the first-mentioned valve is seated.

2. A liquid-dispensing mechanism comprising a measuring vessel, a coupling depending therefrom and having a lateral nipple adapted to be connected with a source of supply, a check valve in said nipple arranged to control flow from the source of supply, a dispensing faucet depending from the coupling, a cam within the faucet, means for actuating the cam, a valve engaged by the cam and seating in the lower end of the coupling, a spider carried by the valve and in spaced relation thereto above the same, said spider being adapted to unseat the check valve when the last-mentioned valve is seated, and an expansion spring bearing upon the spider and yieldably holding the same lowered and the valve connected therewith seated.

3. In a liquid dispensing apparatus, a measuring vessel, a faucet, means connecting the measuring vessel with the faucet, said means and measuring vessel being adapted to be connected with a source of supply, a cam within the faucet, a valve in said means, said valve being adapted to be unseated by the cam, flow controlling means carried by said first mentioned means, and means carried by said first mentioned valve and adapted for engaging said flow controlling means for shifting the same when the first mentioned valve is seated.

4. In a liquid dispensing apparatus, a measuring vessel, a coupling depending therefrom and having a nipple adapted to be connected to a source of supply, a check valve in said nipple for controlling flow from said source of supply, a cam in the faucet, and a valve carried in the faucet and having a spider engageable with the check valve for unseating said check valve whereby flow from the source of supply will be controlled by said last mentioned valve and cam, said last mentioned valve also being operable for permitting flow from the measuring vessel.

5. In a liquid dispensing apparatus, a measuring vessel, a faucet, means connecting the faucet with the measuring vessel, a source of supply connected with said means and including a nipple, a cam within the faucet, a valve in said nipple, and a valve in said means having a spider and being adapted to be unseated by the cam for engaging said spider with said first mentioned valve whereby said first mentioned valve and said last mentioned valve and said cam will control flow from the measuring vessel and said source of supply.

DAVID E. DOBYNS.